(12) United States Patent
Klein

(10) Patent No.: US 9,747,759 B2
(45) Date of Patent: Aug. 29, 2017

(54) AUTOMATIC CASH REGISTER SYSTEM WITH MOTION SEQUENCE CONTROL

(71) Applicant: Wincor Nixdorf International GmbH, Paderborn (DE)

(72) Inventor: Gordon Klein, Dallgow (DE)

(73) Assignee: Wincor Nixdorf International GMBH, Paderborn (DE)

( * ) Notice: Subject to any disclaimer, the term of this patent is extended or adjusted under 35 U.S.C. 154(b) by 0 days.

(21) Appl. No.: 15/022,253

(22) PCT Filed: Sep. 17, 2014

(86) PCT No.: PCT/EP2014/069797
§ 371 (c)(1),
(2) Date: Mar. 16, 2016

(87) PCT Pub. No.: WO2015/040062
PCT Pub. Date: Mar. 26, 2015

(65) Prior Publication Data
US 2016/0232757 A1    Aug. 11, 2016

(30) Foreign Application Priority Data

Sep. 17, 2013  (EP) .................................... 13184748

(51) Int. Cl.
*G06K 15/00* (2006.01)
*G07G 1/12* (2006.01)
(Continued)

(52) U.S. Cl.
CPC ............... *G07G 1/12* (2013.01); *A47F 9/047* (2013.01); *G06K 7/10564* (2013.01); *G06Q 20/208* (2013.01); *G07G 1/0054* (2013.01)

(58) Field of Classification Search
CPC .......... G06K 15/00; G06K 19/00; G06K 7/00; G06F 17/00; G06Q 40/00; G06Q 20/00; G07D 11/00; G07F 19/00; G07F 7/04
(Continued)

(56) References Cited

U.S. PATENT DOCUMENTS

| 5,083,638 A | 1/1992 | Schneider |
| 8,988,186 B1 * | 3/2015 | Dent .................. G06Q 20/1085 235/375 |

(Continued)

FOREIGN PATENT DOCUMENTS

| DE | 36 19 362 | 12/1987 |
| DE | 94 21 810 | 10/1996 |

(Continued)

OTHER PUBLICATIONS

International Search Report.

*Primary Examiner* — Edwyn Labaze
(74) *Attorney, Agent, or Firm* — Gerald E. Hespos; Michael J. Porco; Matthew T. Hespos

(57) ABSTRACT

The invention relates to a cash register system (10) comprising a scanner (12, 14) for scanning articles and a deposit unit (18) for depositing the scanned articles. Further, the cash register system (10) comprises a sensor unit (22, 30) for detecting a sequence of motions of the user of the cash register system (10). A control unit selects one of several preset cash register functions dependent on the sequence of motions detected by means of the sensor unit (20, 30) and controls the cash register system (10) accordingly.

15 Claims, 7 Drawing Sheets

(51) Int. Cl.
　　*A47F 9/04*　　　(2006.01)
　　*G07G 1/00*　　　(2006.01)
　　*G06Q 20/20*　　 (2012.01)
　　*G06K 7/10*　　　(2006.01)

(58) Field of Classification Search
　　USPC .......... 235/383, 375, 487, 379, 439; 705/16;
　　　　　　　　　　　　　　　　　　　　　　　　194/206
　　See application file for complete search history.

(56) References Cited

U.S. PATENT DOCUMENTS

| | | | |
|---|---|---|---|
| 2008/0005036 A1 | 1/2008 | Morris | |
| 2009/0152800 A1* | 6/2009 | Nutzel | B65H 7/08 271/18 |
| 2009/0320106 A1* | 12/2009 | Jones | G06Q 20/1085 726/5 |
| 2010/0131374 A1* | 5/2010 | Sanders | G06Q 20/20 705/16 |
| 2013/0186729 A1* | 7/2013 | Miksic | G07D 11/0006 194/206 |
| 2013/0332271 A1* | 12/2013 | Hay | G06Q 20/20 705/14.51 |
| 2014/0337212 A1* | 11/2014 | Crist | G07F 19/207 705/43 |

FOREIGN PATENT DOCUMENTS

| | | |
|---|---|---|
| DE | 10 2004 046 597 | 4/2006 |
| EP | 0 897 105 | 2/1999 |
| EP | 0 940 786 | 9/1999 |

\* cited by examiner

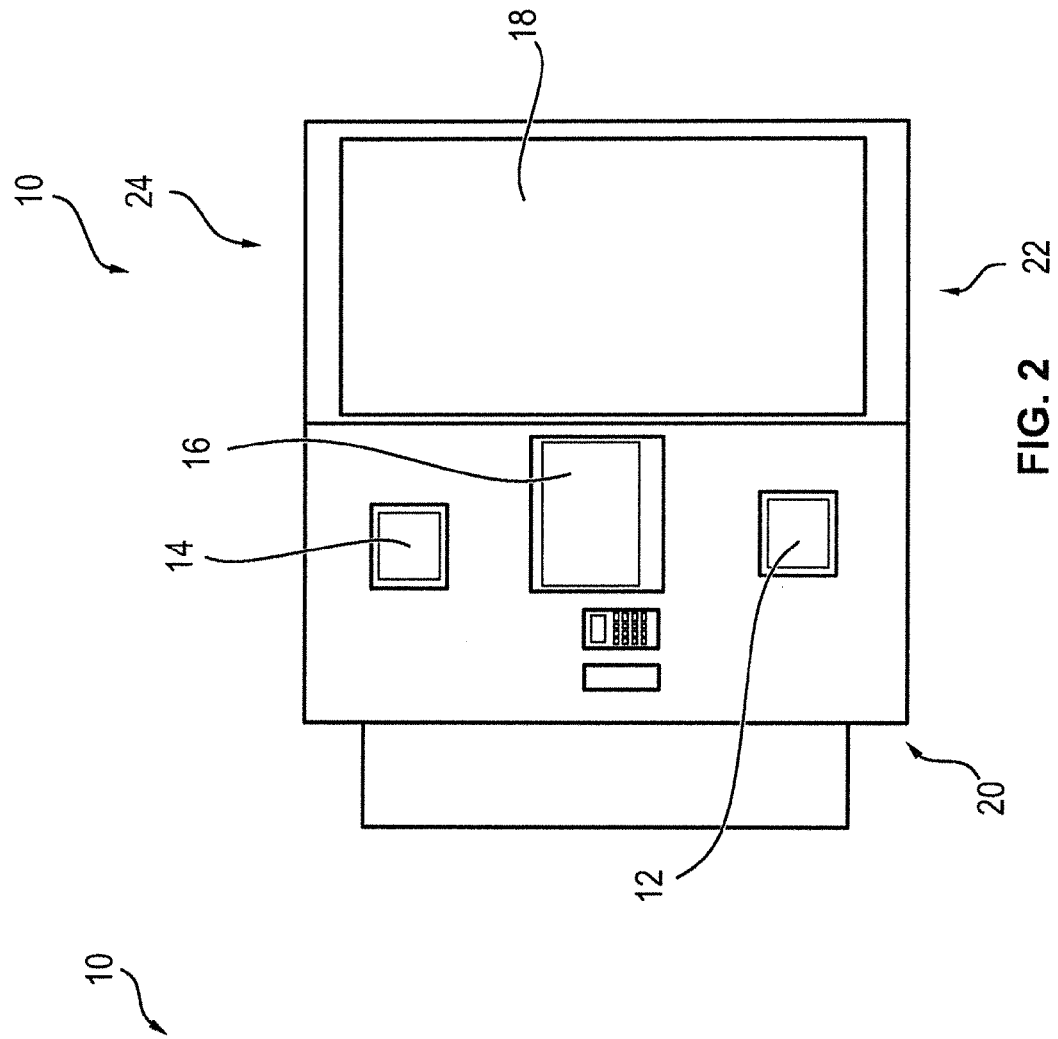
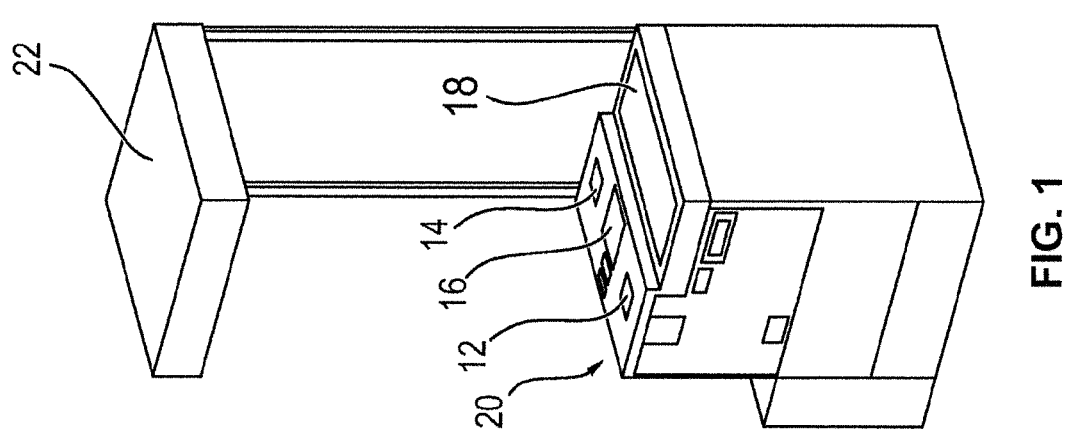

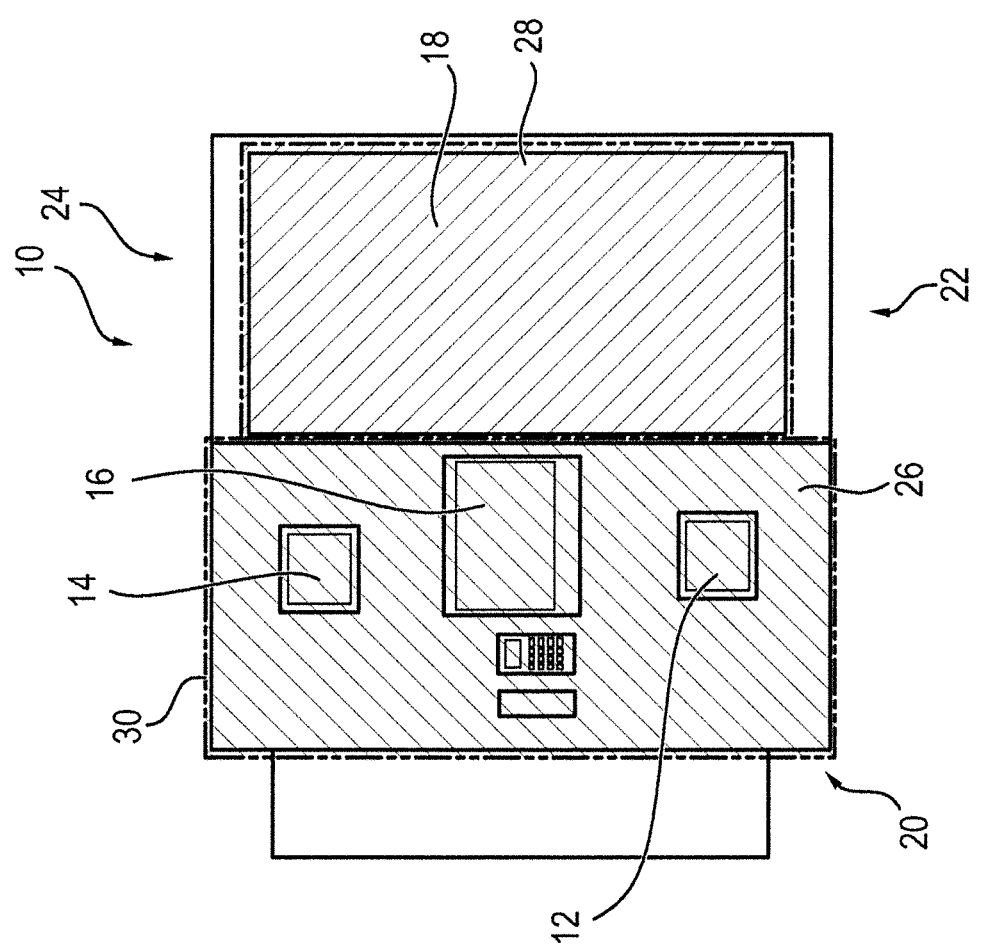

AUTOMATIC CASH REGISTER SYSTEM WITH MOTION SEQUENCE CONTROL

BACKGROUND

1. Field of the Invention

The invention relates to a cash register system comprising a scanner for scanning selected articles by a user of the cash register system and a deposit unit for depositing scanned articles.

2. Description of the Related Art

In known self-service cash register systems, the customers pass the articles selected by them individually one after the other over a scanner, via which the bar code of the articles is scanned. Thereafter, the scanned articles have to be put into bags by the customers before the articles are weighed by means of a scale. In this way, the weight of a newly added article can always be determined and, in doing so, it can be checked by means of a weight data base whether the article put into the bag corresponds to the article scanned by means of the scanner. If the customer wishes to carry out certain cash register functions, such as the cancellation of an already scanned article, then in the case of known cash register systems the user has to manually input this via corresponding operating elements, such as a touch screen. Often, the input units of such cash register functions are complex for the customer and difficult to understand. In addition, problems may occur when the customer does not stick to the sequence of steps provided for the operation of the cash register system in that the user, for example, again removes already scanned articles from the bags. In this case, the cash register system usually asks the customer to put the article back again before the user can then continue scanning.

From document DE 10 2004 046 597 A1, a cash register system is known in which articles are transported by means of a transport belt. To prevent an unauthorized removal of articles from the belt, a so-called light curtain consisting of light barriers is provided.

Document DE 36 19 362 A2 describes the monitoring of the presence of articles by means of light barriers.

It is the object of the invention to specify a cash register system which offers a high degree of safety and which can be operated easily and comfortably by the customer.

SUMMARY

According to the invention, the cash register system comprises a sensor unit for detecting a sequence of motions of the user. Dependent on the sequence of motions detected by means of the sensor unit, a control unit of the cash register system selects one of several preset cash register functions and controls the cash register system such that it carries out the selected cash register function.

As a result, it is achieved that the cash register system can be controlled intuitively by the user. In particular, the cash register functions do not have to be input by the user via operating elements. Further, the detection of the sequence of motions of the customer and the automatic control of the cash register system based thereon makes it possible that attempted frauds are prevented since the sequence of the detection of the articles is not only controlled by inputs made by the customer, which may be contradictory to actual actions, but takes place based on the action actually performed by the user.

In a particularly preferred embodiment, a plurality of possible sequences of motions is stored in a memory element of the control unit, wherein one cash register function is unambiguously assigned to each of these possible sequences of motions. The control unit compares the sequence of motions determined by means of the sensor unit with the stored possible sequences of motions and, dependent on the result of this comparison, selects the cash register function that is subsequently performed by the cash register system. In particular, the control unit selects that one of the possible sequences of motions that is the most similar to the determined sequence of motions.

The sensor unit can, for example, comprise a camera for capturing an image of an operating area of the cash register system. By means of the camera in particular an image of this operating area is captured, which image is evaluated by the control unit by means of stored image processing programs such that the sequence of motions of the user can be determined. In particular, an image sequence of several images is captured, dependent on which then the sequence of motions of the user is determined.

Additionally or alternatively to the camera, the sensor unit can also comprise an infrared camera for capturing an infrared image of the operating area of the cash register system. Dependent on the captured infrared image, then in particular the sequence of motions is determined. Here, too, preferably an image sequence of infrared images is captured.

By means of the infrared image, the control unit classifies in particular detected objects into body parts of the user and other objects. Thus, in particular a distinction can be made between body parts and articles so that an accurate determination of the sequence of motions and of the intended action of the user can take place.

The operating area in particular comprises the scanner and the deposit unit. In a particularly preferred embodiment, the operating area that is captured by the camera comprises the entire upper area of the cash register table, i.e. the entire area in which articles are handled by the user.

Further, it is advantageous when the sensor unit comprises at least one light barrier for detecting the sequence of motions of the user. By means of the light barrier it can in particular be detected whenever articles are moved from where to where. In particular, a plurality of light barriers is provided to enable a particularly accurate detection of the sequence of motions.

In another embodiment, instead of light barriers, double light barrier arrangements are provided. By double light barrier it is understood that two parallel extending light barriers are provided, i.e. that the light beams of these light barriers run parallel to each other at a predetermined distance. The use of such double light barriers has the advantage that the direction of a motion can be determined in that is it detected which one of the two light barriers of the double light barrier is interrupted first.

In a further embodiment, the scanner is surrounded by a first double light barrier arrangement that surrounds a first field in which at least the scanner is arranged. Likewise, the deposit unit is surrounded by a second double light barrier arrangement that surrounds a second field in which at least the deposit unit is arranged. By way of these two fields the sequence of motions and thus the flow of articles can reliably be detected in a particularly easy manner. In particular, by means of the double light barriers a feeding and removing of articles from the two fields can be determined, wherein, dependent on the feeding and removal sequence, a sequence of motions can be determined. If, for example, an article is at first fed to the first field and scanned thereat and thereafter fed to the second field, i.e. placed in the deposit area, then this is interpreted as a planned detection of the article, provided that it is not again removed from the second field thereafter. If, on the other hand, an article is detected in the first field and not moved further into the second field, i.e. the deposit unit, but is moved out of the first field in another direction, this is interpreted as a cancellation of the detected article by the cash register system. Likewise, a removal of an already detected and deposited article from the second field can be interpreted as a cancellation of this article.

In still another embodiment, both the double light barrier arrangements and an infrared camera are provided. This makes it possible to identify whether the motions detected by means of the double light barrier arrangements are each time only caused by a body part of the user or whether in addition an article is moved.

In addition, the sensor unit can comprise a scale for determining the weight of the articles received in the deposit unit. Thus, it can be checked very accurately whether the article detected by means of the scanner corresponds to the article deposited in the deposit unit. In addition, this can also be guaranteed by means of the two fields since the feeding of another article or the removal of the scanned article could likewise be determined by them.

The scale that serves to determine the weight of the articles received in the deposit unit in particular also serves as a so-called fruit scale, by means of which the weight of articles with weight-dependent prices is determined. This has the advantage that only one scale has to be used.

Further, it is advantageous when the cash register system comprises a customer guiding system for guiding the sequence of motions of a user. By means of the customer guiding system it can be displayed to the customer which next steps the customer may execute and which consequences, i.e. which cash register functions, this would have.

The customer guiding system in particular comprises a screen for displaying information. Via the screen the customer can, for example, be asked to deposit a scanned article in the deposit unit. The screen is preferably a touch screen, via which also operating commands, such as the end of the article detection and the desired type of payment, can be input.

Additionally or alternatively, the customer guiding system can also optionally comprise illuminable symbols, such as arrows, characters or lines, with which possible alternatives of motions can be displayed to the user. For example, by means of arrows it can be indicated to the user that the user shall deposit a scanned article in the deposit unit.

Further features and advantages of the invention result from the following description which explains the invention in more detail on the basis of embodiments in connection with the enclosed Figures.

BRIEF DESCRIPTION OF THE DRAWINGS

FIG. 1 shows a schematic, perspective illustration of a cash register system.

FIG. 2 shows a top view of the cash register system according to FIG. 1.

FIG. 3 shows a further top view of the cash register system according to FIGS. 1 and 2.

SUMMARY

Figure 4:
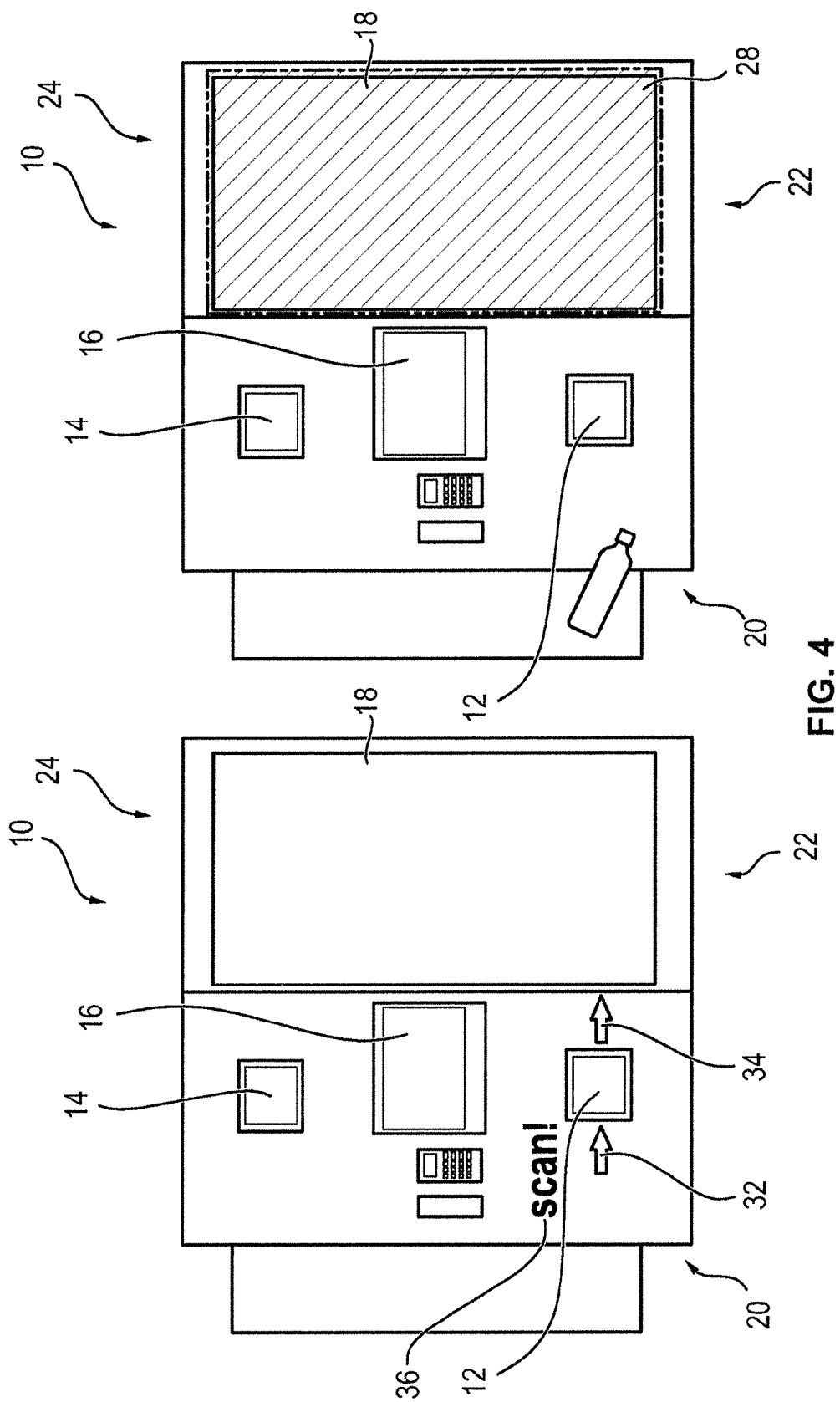
FIG. 4 shows a top view of the cash register system according to FIGS. 1 to 3 in a first operating state.

In FIG. 1, a schematic, perspective illustration of a cash register system 10 is shown. FIG. 2 shows a top view of an operating panel 20 of this cash register system 10.

The cash register system 10 comprises a first scanner 12 and a second scanner 14 for scanning selected articles, a touch screen 16, via which information can be displayed to the person operating the cash register system as well as a deposit unit for the deposit of the scanned articles, which is designed as a bagging area 18.

The cash register system 10 shown in FIGS. 1 and 2 is designed as a cash register system 10 which is operable from both sides. Thus, the first scanner 12 serves to scan articles by a customer present on the first side 22 of the cash register system 10 and the second scanner 14 serves to scan articles by a cashier present on the second side 24 of the cash register system 10 opposite to the first side 22. In an alternative embodiment, the cash register system 10 can also only be operable from one side 22, 24. In this case, in particular only one scanner 12, 14 is provided.

Above the operating panel 20, a camera unit 22 is arranged at a predetermined distance, by means of which images of the operating panel 20 can be captured. The camera unit 22 comprises in particular an infrared camera for capturing infrared images with representations of the operating panel 20.

For detecting the articles selected by the user, the user moves one article after the other over the first scanner 12 and thereafter places the article in the bagging area 18. After the user has scanned all articles selected by him/her, the user confirms this via the touch screen 16 and thereafter pays the total amount due. In order to make the entire operation as easy and comfortable as possible for the customer and, on the other hand, nevertheless guarantee a safety as high as possible for the dealer operating the cash register system 10, two fields 26, 28 are surrounded by means of double light barrier arrangements, one of which is exemplarily identified with the reference sign 30, as illustrated in FIG. 3. The first field 26 surrounds the two scanners 12, 14 and the touch screen 16. The double light barrier arrangements 30 of the second field 28, on the other hand, surround the bagging area 18. In an alternative embodiment, the first field 26 may also only surround the first scanner 12.

By a double light barrier arrangement 30 it is understood within the scope of this application that the light beams of two light barrier arrangements are guided parallel to each other at a predetermined distance so that a direction of motion of articles moved through the double light barrier arrangement can be determined. In particular, the double light barrier arrangements 30 are each designed as two parallel extending light barrier curtains. Light barrier curtain is in particular defined as a plurality of light barriers extending within one plane, the light barriers of which extend relative to each other so close that no articles which usually have to be paid for can be passed through the light barrier curtain without at least one of the light barriers of the light barrier curtain being interrupted. The two light barrier curtains of a double light barrier arrangement are arranged parallel to each other.

By means of the two fields 26, 28 delimited by the double light barrier arrangement 30 it can easily be determined each time whether an object is fed to the respective field or removed therefrom. By the simultaneous capturing of an infrared image by means of the infrared camera arranged in the camera unit 22 it can be determined whether this object is a body part of the user, for example the hand, or whether it is an article. If it is determined that only a body part is concerned, this is not relevant for the flow of articles to be detected and is not taken into account for this.

The bagging area 18 comprises a scale, by means of which the weight of all articles present in the bagging area 18 can be determined with high accuracy. In this way, the feeding or the removal of articles can be determined with an accuracy of one article. In addition, this scale can also be used as a fruit scale for weighing fruits and other articles with weight-dependent prices.

In the following, it is shown in connection with FIGS. 4 to 9 on the basis of several operating states how it is detected by means of the double light barrier arrangements 30 and the other sensors 22 on the basis of the sequence of motions of the user which action is intended by the user and, dependent thereon, the corresponding cash register function is automatically carried out by the cash register system 10.

In FIG. 4, the operating state of the cash register system 10 is shown prior to the scanning of an article. Via the touch screen 16, the instruction "Scan an article and place it in the bagging area" is displayed to the user. The light barriers 30 of both fields 16, 18 are not yet interrupted in this case. By means of the arrow 33 and the sign 36 "scan!", the user is assisted in the operation of the cash register system 10. Here, the arrows 33, 34 as well as the sign 36 are in particular designed as illuminable elements in the operating panel 20 of the cash register system 10 and are selectively illuminated so that the customer perceives the signs 32 to 36 as an instruction.

Figure 5:
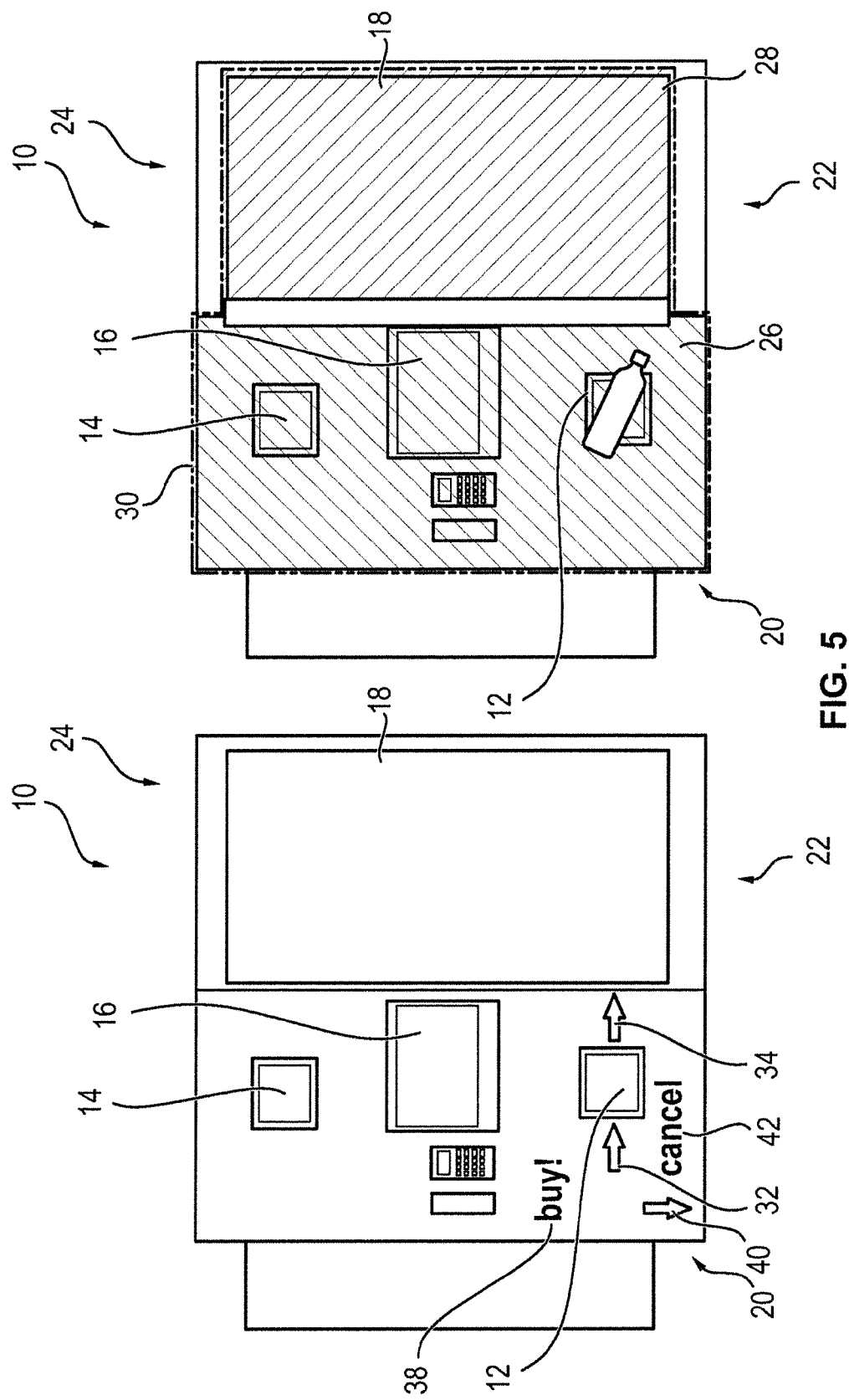
FIG. 5 shows a top view of the cash register system according to FIGS. 1 to 3 in a second operating state.

In FIG. 5, the operating state is illustrated after the customer has scanned the article but has not yet removed it from the first field 26. By the interruption of the light barriers 30 of the first field 20 prior to the feeding, the feeding of the article into the first field 20 for scanning could be determined. As long as the light barriers 30 of the first field 26 are not interrupted again, the article still has to be in the first field 26. After scanning, now the arrow 34 is displayed together with the sign "buy!" 38. In addition, an arrow 40 directed toward the user and the sign 42 "cancel" is displayed. Thus, two possible operating options are displayed to the user. For the correct deposition of the article for purchasing the article, the article has to be fed to the bagging area 18 in accordance with the arrow 34. If, on the other hand, the user wishes to cancel the article, he/she moves the article towards him/her in the direction of the arrow 40. By means of the light barriers 30, the cash register system 10 can detect which of these two sequences of motions is selected by the user. If the user moves the scanned article to the right from the first field 26 into the second field 28, at first the double light barriers 30 of the first field 26 and then the double light barriers 30 of the second field 28 are interrupted. In this case, the cash register system 10 identifies this sequence of motions and knows that the user wishes to buy the article and charges it accordingly.

If, on the other hand, the user removes the article from the first field 26 towards himself/herself, this is detected accordingly by the light barriers 30 of the first field 26. The control unit of the cash register system 10 interprets this sequence of motions of the user as a cancellation of the last scanned article in accordance with the display.

Figure 6:
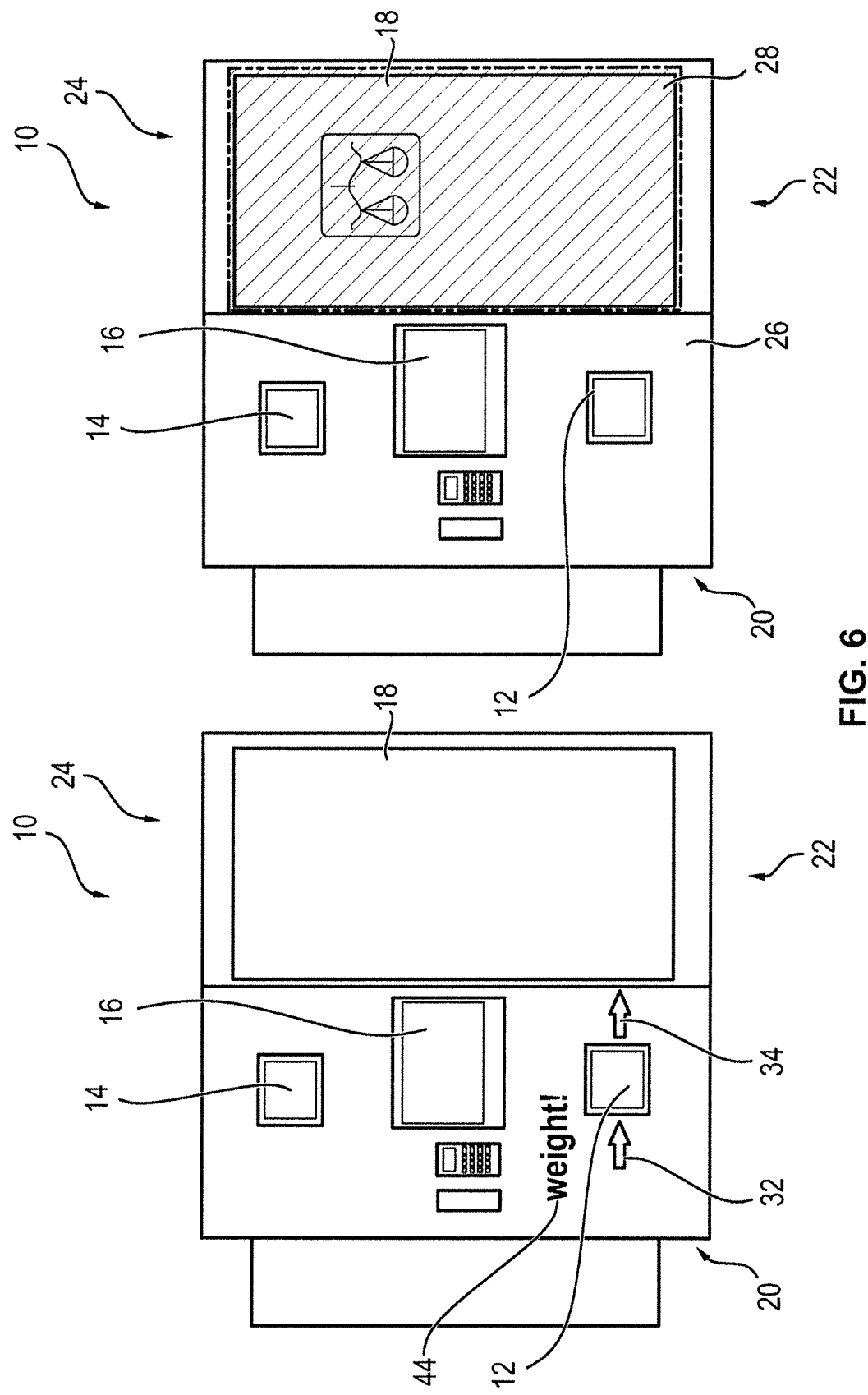
FIG. 6 shows a top view of the cash register system according to FIGS. 1 to 3 in a third operating state.

In FIG. 6, the operating state is illustrated when the article scanned in the operating state in FIG. 4 is an article having a weight-dependent price. In this case, the customer is asked to place the article in the bagging area 18 for weighing and thus for price calculation. For this, on the one hand, a corresponding instruction is displayed on the touch screen 16. On the other hand, the arrow 34 which is directed to the bagging area is displayed and further a sign 44 "weight!" is displayed to guide the customer accordingly. If the customer complies with these instructions and deposits the article in the bagging area 18, this is perceived via the light barriers 30 of the fields 26, 28 and the price is determined dependent on the weight. But if the article is not placed in the bagging area 18, the user is informed about this via the touch screen 16 and is asked to operate a return button which is displayed via the touch screen 16.

Figure 7:
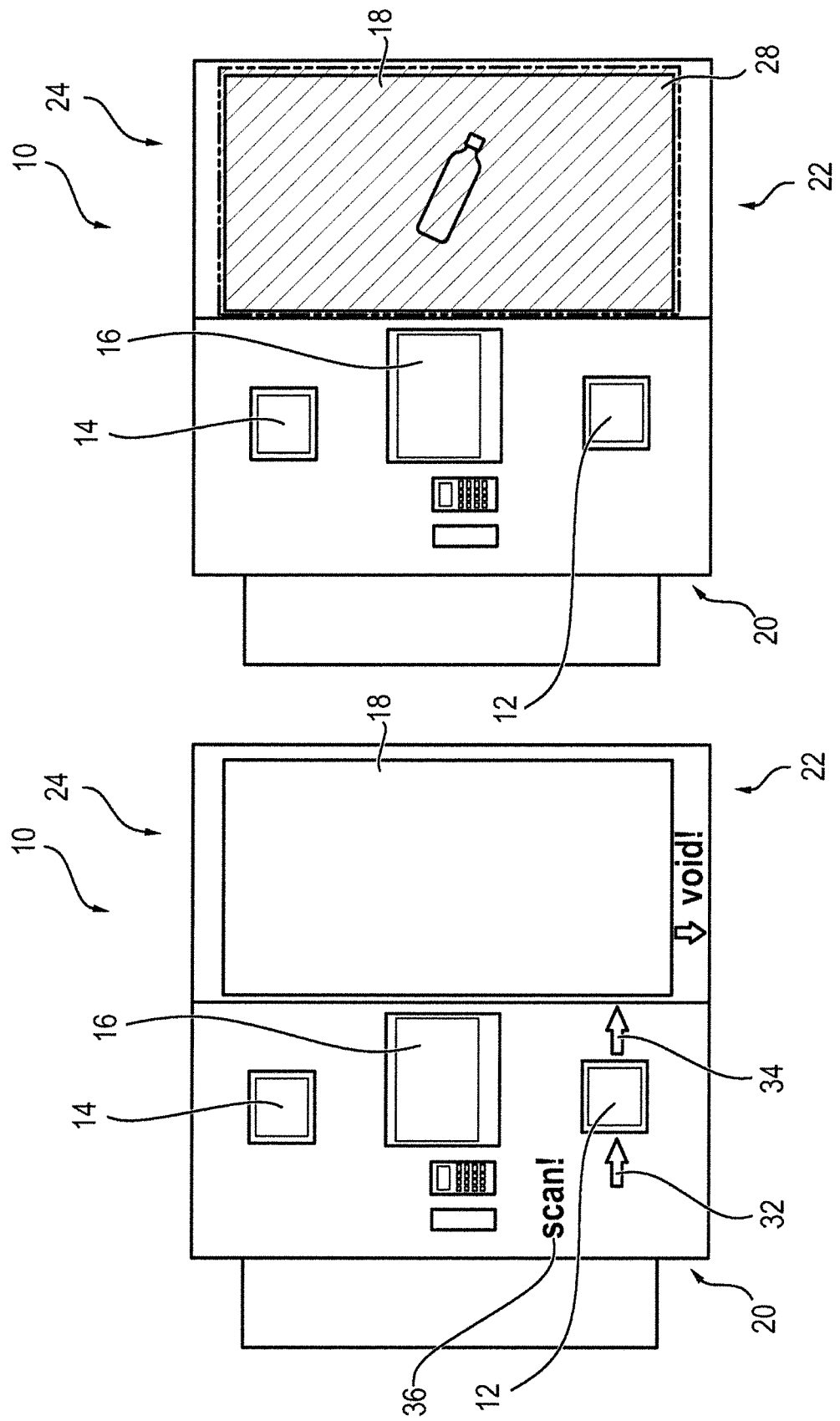
FIG. 7 shows a top view of the cash register system according to FIGS. 1 to 3 in a fourth operating state.

In FIG. 7, the cash register system 10 is illustrated in an operating state after an article has been scanned and orderly placed in the bagging area 18. Via the touch screen 16, the customer is asked to scan the next article. Accordingly, the arrow 33 and the sign 36 are displayed. If, instead of the scanning of the next article, an article is removed from the bagging area 18, this is detected by the corresponding light barriers of the second field 28. By means of the scale of the bagging area 18, it can accurately be determined which article has been removed. The removed article is cancelled accordingly and is deducted from the subtotal that has to be paid.

Figure 8:
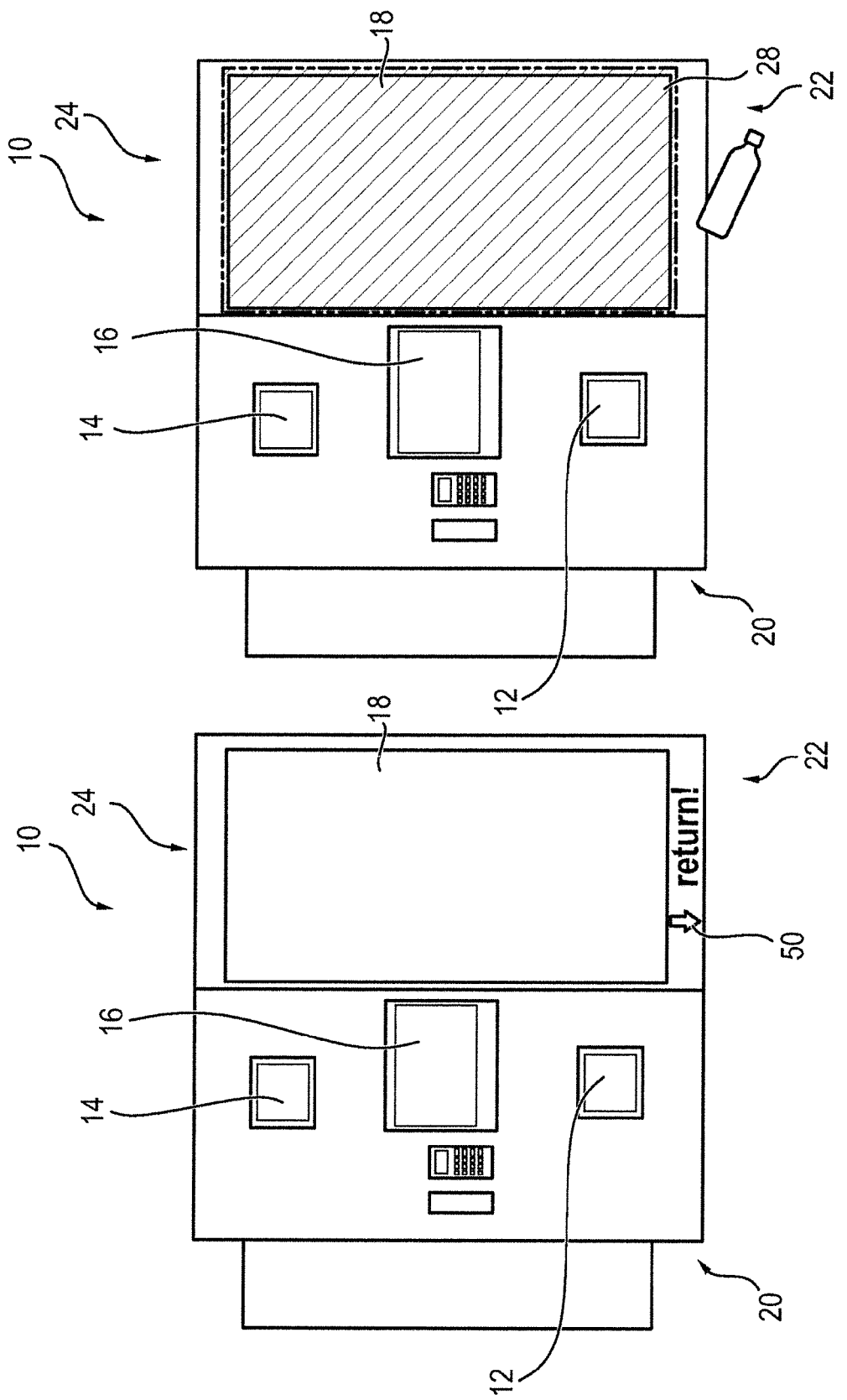
FIG. 8 shows a top view of the cash register system according to FIGS. 1 to 3 in a fifth operating state.

In FIG. 8, an operating state is illustrated, in which an article is fed to the bagging area 18 without being scanned first. This can easily be determined by means of the light barriers 30, in that the article is only passed through the light barriers 30 of the second field 28 but not through the first field 26. In this case, a display is displayed to the customer via the touch screen 16 informing him/her that the article has not been scanned and asks him/her to remove it from the bagging area 18. For this, the arrow 50 and the sign "return!" is displayed in this case. Thereafter, the article removal is again monitored via the weight of the bagging area 18.

Altogether, the afore-described detection of the sequences of motions of the cash register system 10 and the automatic control of the cash register system, dependent on the determined sequences of motions, makes an intuitive control of the cash register system 10 by the customer and a safe reliable detection of articles possible.

LIST OF REFERENCE SIGNS

10 cash register system
12, 14 scanner
16 touch screen
18 bagging area
20 operating panel
22 camera unit
24, 26 side
26, 28 field
30 double light barrier arrangement
32, 34, 40, 50 arrow
36, 38, 44 sign

The invention claimed is:

1. A cash register system (10), comprising:
    a scanner (12, 14) for scanning selected articles by a user of the cash register system (10),
    a deposit unit (18) for depositing scanned articles,
    a sensor unit (22, 30) for detecting a sequence of motions of the user, the scanner (12, 14) being surrounded by a first double light barrier arrangement (30) that surrounds a first field (26) in which at least the scanner (12, 14) is arranged, and that the deposit unit (18) is surrounded by a second double light barrier arrangement (30) that surrounds a second field (28) in which at least the deposit unit (18) is arranged, and a control unit that selects one of several preset cash register functions dependent on the sequence of motions detected by the sensor unit (22, 30) and controls the cash register system (10) in accordance with the selected cash register function.

2. The cash register system (10) of claim 1, wherein the control unit comprises a memory unit that stores a plurality of possible sequences of motions, one cash register function is assigned to each of these possible sequences of motions, the control unit being configured to: compare the sequence of motions determined by the sensor unit with the stored possible sequences of motions, select one of the possible sequences of motions dependent on the comparison and carry out the assigned cash register function.

3. The cash register system (10), of claim 1, wherein the sensor unit (22, 30) comprises at least one camera (22) for capturing an image of an operating area (20) of the cash register system (10).

4. The cash register system (10) of claim 1, wherein the sensor unit (22, 30) comprises at least one infrared camera (22) for capturing an infrared image of an operating area (20) of the cash register system.

5. The cash register system (10) of claim 4, wherein the control unit classifies objects detected by the infrared image into body parts of the user and other objects or articles.

6. The cash register system (10) of claim 3, wherein the scanner (12, 14) and/or the deposit unit (18) are arranged within the detected operating area (20).

7. The cash register system (10) of claim 1, wherein the first double light barrier arrangement (30) and/or the second double light barrier arrangement (30) each comprise two light barrier arrangements, the beams of which run parallel to each other at a predetermined distance.

8. The cash register system (10) of claim 1, wherein by means of the double barrier arrangement (30) a feeding or removal of articles from the fields (26, 28) is determined, and that a sequence of motions is determined dependent on the feeding and/or removal sequence.

9. The cash register system (10) of claim 1, wherein the control unit determines a direction of motion by means of the double light barrier arrangements (30).

10. The cash register system (10) of claim 1, wherein the sensor unit (22, 30) comprises a scale for determining the weight of the articles received in the deposit unit (18).

11. The cash register system (10) of claim 10, wherein the scale also serves as a scale for determining the weight of articles having weight-dependent prices.

12. The cash register system (10) of claim 1, wherein the cash register system (10) comprises a customer guiding system (16, 32 to 50) for guiding the sequence of motions of a user.

13. The cash register system (10) of claim 12, wherein the customer guiding system (16, 32 to 50) comprises a screen (16) for displaying information to the user and/or optionally illuminable symbols (32 to 50) for displaying possible motion sequence alternatives.

14. The cash register system (10) of claim 1, wherein the control unit comprises a memory unit that stores a plurality of possible sequences of motions, one cash register function is assigned to each of these possible sequences of motions, the control unit being configured to: compare the sequence of motions determined by the sensor unit with the stored possible sequences of motions, select one of the possible sequences of motions dependent on the comparison and carry out the assigned cash register function.

15. The cash register system (10) of claim 1, wherein the control unit classifies objects detected by the infrared image into body parts of the user and other objects or articles.

\* \* \* \* \*